(12) United States Patent
Yamasaki et al.

(10) Patent No.: US 9,068,051 B2
(45) Date of Patent: Jun. 30, 2015

(54) METHOD FOR PRODUCING REFINED POLYROTAXANE

(75) Inventors: Tomoaki Yamasaki, Hyogo (JP); Shinya Okazaki, Hyogo (JP); Hiroki Okazaki, Hyogo (JP); Shigeki Hamamoto, Hyogo (JP); Changming Zhao, Chiba (JP)

(73) Assignees: Sumitomo Seika Chemicals Co., Ltd., Hyogo (JP); Advanced Softmaterials Inc., Chiba (JP)

( * ) Notice: Subject to any disclaimer, the term of this patent is extended or adjusted under 35 U.S.C. 154(b) by 0 days.

(21) Appl. No.: 13/994,566

(22) PCT Filed: Dec. 5, 2011

(86) PCT No.: PCT/JP2011/078023
§ 371 (c)(1),
(2), (4) Date: Jul. 30, 2013

(87) PCT Pub. No.: WO2012/081432
PCT Pub. Date: Jun. 21, 2012

(65) Prior Publication Data
US 2013/0331562 A1 Dec. 12, 2013

(30) Foreign Application Priority Data

Dec. 16, 2010 (JP) .................. 2010-280264
Dec. 16, 2010 (JP) .................. 2010-280265
May 10, 2011 (JP) .................. 2011-105254

(51) Int. Cl.
*C08B 37/16* (2006.01)
*C08G 65/06* (2006.01)
*C08G 83/00* (2006.01)
*C08G 65/30* (2006.01)
*C08J 3/12* (2006.01)
*C08L 71/02* (2006.01)

(52) U.S. Cl.
CPC .......... *C08G 83/007* (2013.01); *C08B 37/0015* (2013.01); *C08G 83/006* (2013.01); *C08L 71/02* (2013.01)

(58) Field of Classification Search
None
See application file for complete search history.

(56) References Cited

U.S. PATENT DOCUMENTS

| 5,855,900 | A | * | 1/1999 | Nobuhiko | 424/425 |
| 6,037,387 | A | * | 3/2000 | Yui et al. | 523/112 |
| 6,100,329 | A | * | 8/2000 | Gibson et al. | 525/55 |
| 6,828,378 | B2 | * | 12/2004 | Okumura et al. | 525/55 |
| 2001/0033868 | A1 | * | 10/2001 | Rossling et al. | 424/497 |
| 2005/0101624 | A1 | * | 5/2005 | Betts et al. | 514/291 |
| 2005/0123614 | A1 | * | 6/2005 | Kim et al. | 424/489 |
| 2013/0331562 | A1 | * | 12/2013 | Yamasaki et al. | 536/46 |

FOREIGN PATENT DOCUMENTS

| EP | 1 921 105 | 5/2008 |
| JP | 2005-154675 | 6/2005 |
| JP | 2005-272664 | 10/2005 |
| JP | 2006-316089 | 11/2006 |
| JP | 2008-310286 | 12/2008 |

OTHER PUBLICATIONS

Fleury, et al., "Synthesis and characterization of high molecular weight polyrotaxanes: towards the control over a wide range of threaded α-cyclodextrins", Soft Matter, vol. 1, No. 5, 2005, pp. 378-385 (XP055120936).

"Kagaku Daijiten 2", Kyoritsu Shuppan Co., Ltd., 1993, Pocket Edition, 34th Impression, pp. 658-659, with partial translation.

"Kagaku Daijiten 8", Kyoritsu Shuppan Co., Ltd., 1987, Pocket Edition, 30th Impression, pp. 214-215, with partial translation.

* cited by examiner

*Primary Examiner* — James J Seidleck
*Assistant Examiner* — Peter A Salamon
(74) *Attorney, Agent, or Firm* — Hamre, Schumann, Mueller & Larson, P.C.

(57) ABSTRACT

The present invention aims to provide a method for producing a refined polyrotaxane which includes an industrially advantageous method of producing a polyrotaxane that has excellent storage stability. The method for producing a refined polyrotaxane includes the step of heat-cleaning a polyrotaxane with a cleaning medium, the polyrotaxane containing cyclodextrin molecules, a polyethylene glycol which is included in the cavities of the cyclodextrin molecules in a skewered manner, and a capping group that is placed at each end of the polyethylene glycol and prevents dissociation of the cyclodextrin molecules from the polyethylene glycol.

6 Claims, No Drawings

METHOD FOR PRODUCING REFINED POLYROTAXANE

TECHNICAL FIELD

The present invention relates to a method for producing a refined polyrotaxane.

BACKGROUND ART

"Slide-ring gels", new gels different from physical gels and chemical gels, have been developed in recent years. A compound that is used for such slide-ring gels and is drawing attention is a crosslinked polyrotaxane.

A crosslinked polyrotaxane has a structure in which linear molecules thread through cyclic molecules in a skewered manner and the cyclic molecules are movable along the linear molecules (has a pulley effect). The pulley effect allows the crosslinked polyrotaxane to be viscoelastic and to uniformly distribute tensile force applied thereto. The crosslinked polyrotaxane is therefore not likely to have cracks or flaws, i.e., has excellent characteristics that conventional crosslinked polymers do not have. Such a crosslinked polyrotaxane is obtainable by placing a capping group at each end of a linear molecule of pseudopolyrotaxanes to prevent dissociation of the cyclic molecules of pseudopolyrotaxanes and crosslinking the resulting polyrotaxanes. The pseudopolyrotaxanes have a linear molecule which is included in the cavities of the cyclic molecules in a skewered manner.

Patent Literature 1 describes a method for obtaining a polyrotaxane which includes mixing a carboxylated polyethylene glycol and a cyclodextrin to obtain a pseudopolyrotaxane that has a carboxylated polyethylene glycol molecule which is included in the cavities of the cyclodextrin molecules in a skewered manner, and capping each end of the pseudopolyrotaxane.

CITATION LIST

Patent Literature

Patent Literature 1: JP 2005-154675 A (Japanese Kokai Publication No 2005-154675)

SUMMARY OF INVENTION

Technical Problem

The present inventors have found that insufficiently refined polyrotaxanes sometimes have unsatisfactory storage stability. The inventors have also confirmed that such polyrotaxanes are likely to be decomposed to release cyclodextrin molecules especially at a storage temperature of 30 to 40° C. Release of cyclodextrin molecules caused by decomposition of polyrotaxanes results in a decrease in the characteristics, such as the pulley effect, of the resulting crosslinked polyrotaxane, limiting the range of application of the crosslinked polyrotaxane for various uses.

Also, known methods for refining a polyrotaxane not only have a low filtration speed to take excessive time, but also have low refining efficiency which inhibits sufficient expression of characteristics of a crosslinked polyrotaxane such as pulley effect in some cases.

The present invention aims to solves the above problem and provide a method for producing a refined polyrotaxane which includes an industrially advantageous method of producing a polyrotaxane that has excellent storage stability.

Solution to Problem

The present invention relates to a method for producing a refined polyrotaxane, including the step of heat-cleaning a polyrotaxane with a cleaning medium, the polyrotaxane containing cyclodextrin molecules, a polyethylene glycol which is included in the cavities of the cyclodextrin molecules in a skewered manner, and a capping group that is placed at each end of the polyethylene glycol and prevents dissociation of the cyclodextrin molecules from the polyethylene glycol.

The present invention is described in detail below.

When polyrotaxanes decompose to produce isolated cyclodextrin molecules (hereinafter also referred to as free cyclodextrin molecules), a crosslinked polyrotaxane produced from such polyrotaxanes shows decreased characteristics such as the pulley effect. For this reason, heating of polyrotaxanes has been avoided so far. The present inventors, however, have found that heat-cleaning in such a temperature range that decomposition is not induced is very important for efficient cleaning.

That is, the present inventors have found that heat-cleaning of polyrotaxanes with a cleaning medium enables industrially advantageous production of refined polyrotaxanes having excellent storage stability, thereby completing the present invention.

The polyrotaxane to be heat-cleaned in the method for producing a refined polyrotaxane according to the present invention is obtainable through an inclusion step of mixing a polyethylene glycol and a cyclodextrin in an aqueous medium to form an aqueous dispersion of pseudopolyrotaxane that contains the polyethylene glycol which is included in the cavities of the cyclodextrin molecules in a skewered manner; a drying step of drying the aqueous dispersion of pseudopolyrotaxane to obtain a dry pseudopolyrotaxane; and a capping step of dispersing the dry pseudopolyrotaxane in a medium that does not dissolve the pseudopolyrotaxane and introducing a capping group at each end of the polyethylene glycol of the pseudopolyrotaxane.

The polyethylene glycol (hereinafter, also referred to as the "PEG") preferably has a weight average molecular weight of 1,000 to 500,000, more preferably 10,000 to 300,000, and still more preferably 10,000 to 100,000. A weight average molecular weight of the PEG of less than 1,000 may result in poor characteristics of a crosslinked polyrotaxane to be obtained by crosslinking the resulting refined polyrotaxanes. A weight average molecular weight of the PEG of more than 500,000 may greatly swell the resulting polyrotaxanes in heat-cleaning, decreasing the cleaning efficiency. The weight average molecular weight herein is a polyethylene glycol equivalent value calculated through measurement by gel permeation chromatography (GPC). A column used for determination of a polyethylene glycol equivalent weight average molecular weight by GPC is, for example, TSKgel Super-AWM-H (product of TOSOH CORPORATION).

The PEG preferably has a reactive group at each end of the molecule. The reactive group can be introduced at each end of the PEG by a conventionally known method.

The reactive group can be appropriately changed depending on the capping group to be used. Examples of the reactive group include, but not particularly limited to, hydroxyl groups, amino groups, carboxyl groups, and thiol groups. Carboxyl groups are particularly preferred. Examples of the method for introducing a carboxyl group at each end of the PEG include a method of oxidizing each end of the PEG using TEMPO (2,2,6,6-tetramethyl-1-piperidinyloxy radicals) and sodium hypochlorite.

In the inclusion step, the weight ratio between the PEG and the cyclodextrin is preferably 1:2 to 1:5, more preferably 1:2.5 to 1:4.5, and still more preferably 1:3 to 1:4. A weight of cyclodextrin of less than twice the weight of the PEG may decrease the number (i.e., inclusion amount) of cyclodextrin molecules including the PEG. A weight of cyclodextrin of more than five times the weight of the PEG may not increase the inclusion amount further, and thus is not economical.

Examples of the cyclodextrin include α-cyclodextrin, β-cyclodextrin, γ-cyclodextrin, and derivatives of these cyclodextrins. Particularly in terms of inclusion property, α-cyclodextrin is preferred. These cyclodextrins may be used alone or in combination.

Examples of the aqueous medium include water, and aqueous mixtures of water and an aqueous organic solvent such as DMF and DMSO. Particularly, water is preferred.

The only required condition for mixing the PEG and the cyclodextrin in the inclusion step is mixing them in the above aqueous medium. Preferably, the PEG and the cyclodextrin are dissolved in the aqueous medium. Specifically, dissolving them in the aqueous medium heated to, typically, 50 to 100° C., preferably 60 to 90° C., and more preferably 70 to 80° C. leads to an almost transparent mixed solution.

Cooling the resulting mixed solution of the PEG and the cyclodextrin precipitates pseudopolyrotaxane particles of the PEG and the cyclodextrin, resulting in a basically white aqueous dispersion of pseudopolyrotaxane.

If the mixed solution is continuously or intermittently cooled while being flowed so that pseudopolyrotaxane particles are precipitated, the resulting aqueous dispersion of pseudopolyrotaxane has good fluidity, does not cause a decrease in fluidity with time, and is suitable for the later-described spray-drying.

If the mixed solution is cooled while being left to stand for precipitation of pseudopolyrotaxane particles, the resulting aqueous dispersion of pseudopolyrotaxane is turned into the form of paste or cream which has very low fluidity, or into the form of gel which has no fluidity. Since an aqueous dispersion of pseudopolyrotaxane turned into the form of paste or cream also loses its fluidity with time, such an aqueous dispersion is preferably stirred and mixed under suitable conditions so as to be fluid before the spray-drying.

The mixed solution is preferably cooled to an end-point temperature of 0 to 30° C., more preferably 1 to 20° C., and still more preferably 1 to 15° C. An end-point temperature of the mixed solution of lower than 0° C. may freeze the aqueous dispersion of pseudopolyrotaxane to decrease the fluidity. An end-point temperature of the mixed solution of higher than 30° C. may not sufficiently precipitate pseudopolyrotaxane particles.

The mixed solution is preferably cooled at a cooling speed of 0.01 to 30° C./min, more preferably 0.05 to 20° C./min, and still more preferably 0.05 to 10° C./min. A cooling speed in cooling the mixed solution of lower than 0.01° C./rain may precipitate very fine pseudopolyrotaxane particles, deteriorating the filterability in heat-cleaning the polyrotaxane. A cooling speed in cooling the mixed solution of higher than 30° C./min may produce large pseudopolyrotaxane particles, resulting in insufficient cleaning of the polyrotaxane in heat-cleaning to decrease the storage stability of the resulting refined polyrotaxane.

For more thorough precipitation of pseudopolyrotaxane particles, intermittent cooling is also possible as described above. Also, the cooling speed or the flowing state of the mixed solution can be changed during the cooling.

The time for retaining the flowing state of the resulting aqueous dispersion of pseudopolyrotaxane after the mixed solution is cooled to a desired temperature is typically several seconds to one week, and preferably several hours to three days.

The method of flowing the mixed solution while cooling the mixed solution may be a known method such as stirring with stirring blades or ultrasonic irradiation.

The degree of flowing the mixed solution is not particularly limited, and may be optionally selected from the range of slight flowing of the mixed solution caused by gentle stirring to strong flowing caused by vigorous stirring using a homogenizer. Excessively weak flowing may precipitate large pseudopolyrotaxane particles, leading to insufficient cleaning in heat-cleaning to decrease the storage stability. In contrast, excessively strong flowing may precipitate very fine pseudopolyrotaxane particles to deteriorate the filterability in heat-cleaning.

If the mixed solution is cooled without being flowed, an aqueous dispersion of pseudopolyrotaxane is turned into the form of gel which has very low fluidity or no fluidity is produced. Hence, reacting a capping agent with each end of the PEG in such an aqueous dispersion turned into the form of gel may not allow the reaction to uniformly proceed.

If a capping agent is reacted with each end of the PEG in the aqueous dispersion of pseudopolyrotaxane in the capping step described later, the resulting polyrotaxane has almost the same particle size as the pseudopolyrotaxane in the aqueous dispersion of pseudopolyrotaxane. For this reason, the particle size of the pseudopolyrotaxane in the aqueous dispersion of pseudopolyrotaxane may affect the filterability and cleaning efficiency in heat-cleaning of the resulting polyrotaxane.

The volume average particle size of the particles in the aqueous dispersion of pseudopolyrotaxane varies depending on the cooling speed, the end-point temperature after the cooling, and the flowing state of the mixed solution during the cooling. The volume average particle size is preferably 1 to 200 μm, more preferably 1 to 100 μm, and still more preferably 1 to 50 μm, in terms of the filterability and cleaning efficiency in heat-cleaning of the resulting polyrotaxane and the fluidity of the aqueous dispersion of pseudopolyrotaxane in spray-drying. If the volume average particle size of the particles in the aqueous dispersion of pseudopolyrotaxane is less than 1 μm, the dispersion may show decreased fluidity or no fluidity. If the volume average particle size of the particles in the aqueous dispersion of pseudopolyrotaxane is more than 200 μm, the particles in the aqueous dispersion of pseudopolyrotaxane may be sedimented. The volume average particle size of the particles in the aqueous dispersion of pseudopolyrotaxane herein can be analyzed using a laser diffraction particle size analyzer.

The pseudopolyrotaxane concentration of the aqueous dispersion of pseudopolyrotaxane (hereinafter, also referred to as a "solids concentration of the aqueous dispersion of pseudopolyrotaxane") is preferably 5 to 25% by weight, more preferably 5 to 20% by weight, and still more preferably 10 to 20% by weight. A solids concentration of the aqueous dispersion of pseudopolyrotaxane of lower than 5% by weight is not economical. A solids concentration of the aqueous dispersion of pseudopolyrotaxane of higher than 25% by weight may decrease the fluidity of the aqueous dispersion of pseudopolyrotaxane, making it difficult to dry the dispersion by an industrially advantageous method such as spray-drying.

The drying step gives high filterability to the resulting polyrotaxane in the heat-cleaning, and thus achieves high cleaning efficiency.

If the polyrotaxane is obtained by reacting the capping agent with the aqueous dispersion of pseudopolyrotaxane without drying, the particle size of the polyrotaxane is almost the same as the particle size of the pseudopolyrotaxane in the aqueous dispersion which is relatively small. Accordingly, the filterability in the heat-cleaning may be low. The filterability in heat-cleaning can be made high and high cleaning efficiency can be achieved by drying the aqueous dispersion of pseudopolyrotaxane and optionally grinding the dried pseudopolyrotaxane to adjust the particle size to a desired value before the reaction with capping groups.

For grinding of the pseudopolyrotaxane obtained by drying the aqueous dispersion of pseudopolyrotaxane, a known grinding device such as a hammer mill, a pin mill, and a ball mill can be used.

In the drying step, particles having a scale-like shape or another shape can be obtained by drying the aqueous dispersion of pseudopolyrotaxane by a method such as freeze-drying or reduced-pressure drying at 70° C. or lower, and grinding the resulting bulky pseudopolyrotaxane. Still, spray-drying is preferred. The spray-drying eliminates the need for grinding after the drying, gives a porous, powdery, and dry pseudopolyrotaxane with unevenness on the surface of the dry particles, and gives high heat-cleaning efficiency after the capping step, thereby producing a polyrotaxane with excellent storage stability. The spray-drying also gives the powdery polyrotaxane with a large particle size compared to the particles in the aqueous dispersion of pseudopolyrotaxane, which achieves favorable filterability in heat-cleaning.

Examples of the method for spraying the aqueous dispersion of pseudopolyrotaxane in the spray-drying include a nozzle method using a pressure nozzle, a two-fluid nozzle, a four-fluid nozzle, or an ultrasonic nozzle, and a rotating disc method.

The nozzle method can be suitably used in the case that the aqueous dispersion of pseudopolyrotaxane has high fluidity. Examples of the device usable for the nozzle method include a nozzle atomizer spray dryer. The method employed in those nozzle atomizer spray dryers is roughly classified into counter spraying of spraying the aqueous dispersion of pseudopolyrotaxane against the hot-gas blowing direction, and parallel spraying of spraying the aqueous dispersion of pseudopolyrotaxane in the same direction as the hot-gas blowing direction. The counter spraying leads to long residence time of the sprayed aqueous dispersion of pseudopolyrotaxane, while the parallel spraying leads to short residence time of the sprayed aqueous dispersion of pseudopolyrotaxane. With such a nozzle atomizer spray dryer, changing the nozzle size to adjust the size of drops to be sprayed allows adjustment of the particle size of the resulting pseudopolyrotaxane to a desired size.

The rotating disc method can be suitably used in the case that the aqueous dispersion of pseudopolyrotaxane has low fluidity, or the pseudopolyrotaxane in the aqueous dispersion of pseudopolyrotaxane has a relatively large particle size. Examples of the device used for the rotating disc method include a rotary atomizer spray dryer. With such a rotary atomizer spray dryer, changing the number of rotations of the disc to adjust the size of drops to be sprayed allows adjustment of the particle size of the resulting powdery pseudopolyrotaxane to a desired size.

The gas to be blown for the spray-drying can be gas such as air or nitrogen.

The blowing temperature in the drying step is preferably 70 to 200° C., more preferably 70 to 180° C., and still more preferably 70 to 170° C. A blowing temperature in the drying step of lower than 70° C. may lead to insufficient drying. A blowing temperature in the drying step of higher than 200° C. may decompose the pseudopolyrotaxane to decrease the inclusion ratio.

The pressure in the system in the spray-drying is not particularly limited, but is typically a pressure near the atmospheric pressure. Drying under a reduced pressure is also possible, and drying under a pressure equal to or lower than the atmospheric pressure is preferred.

The residence time of the sprayed aqueous dispersion of pseudopolyrotaxane is typically several seconds to several minutes, and for suppression of release of cyclodextrin molecules, it is preferably three minutes or shorter, and more preferably two minutes or shorter. Too short a residence time of the sprayed aqueous dispersion of pseudopolyrotaxane leads to insufficient drying.

The diameter of the drops of the aqueous dispersion of pseudopolyrotaxane to be sprayed is preferably 1 to 2,000 µm, and more preferably 5 to 500 µm. A diameter of the drops of smaller than 1 µm may cause the drops to be blown together with the gas, decreasing the drying yield. A diameter of the drops of larger than 2,000 µm may lead to a small total area of the whole drops, decreasing the drying speed.

The volume average particle size of the dry pseudopolyrotaxane to be obtained by spray-drying the aqueous dispersion of pseudopolyrotaxane is preferably 1 to 300 more preferably 5 to 70 and still more preferably 5 to 50 µm. A volume average particle size of the dry pseudopolyrotaxane to be obtained of smaller than 1 µm may cause the drops to be blown together with the gas, decreasing the drying yield. A volume average particle size of the dry pseudopolyrotaxane to be obtained of larger than 300 µm may cause the particles to adhere to the drying device.

The water content of the dry pseudopolyrotaxane is preferably 10% by weight or lower, more preferably 7% by weight or lower, and still more preferably 5% by weight or lower. A water content of the powdery pseudopolyrotaxane to be obtained of higher than 10% by weight results in a large amount of water in the reaction system which deactivates the reaction in the capping step of introducing a capping group at each end of the PEG of the pseudopolyrotaxane. Hence, the reaction may not proceed or the introduction rate of the capping group may decrease.

The capping step of introducing a capping group at each end of the PEG included in cyclodextrin molecules can be performed using a known method. Preferred is a capping method of reacting a capping agent such as adamantaneamine or a salt thereof with a pseudopolyrotaxane having a carboxyl group at each end of the PEG, in terms of the reactivity and the stability of the chemical bonds.

In the capping step, a powdery polyrotaxane can be obtained and the effect of heat-cleaning can be increased using a method of obtaining a polyrotaxane by reacting the capping agent with a pseudopolyrotaxane dispersed in a solvent that does not dissolve the pseudopolyrotaxane, so as to introduce a capping group at each end of the PEG.

The volume average particle size of the polyrotaxane is preferably 1 to 3,000 µm, more preferably 1 to 300 µm, and still more preferably 5 to 70 µm. A volume-average particle size of the polyrotaxane of smaller than 1 µm may give a low filterability in heat-cleaning. A volume average particle size of the polyrotaxane of larger than 3,000 µm may lead to insufficient cleaning, decreasing the storage stability.

The method for producing a refined polyrotaxane according to the present invention includes the step of heat-cleaning a polyrotaxane with a cleaning medium. The method of refining a polyrotaxane by heat-cleaning is preferably a method of separating solids and liquids through centrifugation or filtration of the dispersion of a polyrotaxane resulting from the capping step so as to obtain a wet cake-like polyrotaxane, placing the wet cake-like polyrotaxane in the cleaning medium, and heat-cleaning the polyrotaxane dispersed in the cleaning medium.

The present inventors have found that, when the polyrotaxane used for production of a crosslinked polyrotaxane contains free cyclodextrin molecules, the free cyclodextrin molecules decrease the characteristics of the crosslinked polyrotaxane. That is, the cleaning medium used for heat-cleaning in the method for producing a refined polyrotaxane according to the present invention is preferably a cleaning medium that dissolves cyclodextrin but does not dissolve polyrotaxane. More preferred is a cleaning medium that swells polyrotaxane, for a high cleaning effect.

A cleaning medium is herein defined as a cleaning medium that dissolves polyrotaxane if the medium makes solid polyrotaxane unobservable by naked eyes when 0.5 g of polyrotaxane is mixed with 100 g of the cleaning medium at 20° C. for two hours. Meanwhile, a cleaning medium is defined as a cleaning medium that does not dissolve polyrotaxane if solid polyrotaxane can be observed by naked eyes in the cleaning medium.

Specific examples of the cleaning medium that dissolves cyclodextrin but does not dissolve polyrotaxane include water and lower alcohols such as methanol, and dimethylformamide. Among these, water is preferred because it has a high dissolving property for cyclodextrin and moderately swells polyrotaxane.

The amount of the cleaning medium for use in heat-cleaning in the method for producing a refined polyrotaxane according to the present invention is preferably 5 to 100 times the weight of the polyrotaxane, more preferably 10 to 70 times the weight, and still more preferably 20 to 50 times the weight. An amount of the cleaning medium of less than five times the weight of the polyrotaxane may lead to low storage stability of the resulting polyrotaxane. An amount of the cleaning medium of more than 100 times the weight of the polyrotaxane does not achieve any extra effect, which is not economical.

In heat-cleaning the polyrotaxane dispersed in the cleaning medium, the dispersion is preferably mixed by mechanical stirring or ultrasonic irradiation. The mixing time is typically 10 minutes to 5 hours, and preferably 30 minutes to 2 hours. A mixing time of shorter than 10 minutes may cause insufficient cleaning, leaving free cyclodextrin molecules. A mixing time of longer than 5 hours may not achieve any extra effect, which is not economical.

Heating of polyrotaxane has been avoided because, when the polyrotaxane is decomposed to produce free cyclodextrin molecules, a crosslinked polyrotaxane obtained from such polyrotaxane shows decreased characteristics such as the pulley effect. The present inventors have found that heat-cleaning at temperatures in the range that does not induce decomposition is very important for efficient cleaning.

The temperature in heat-cleaning the polyrotaxane is preferably 40 to 120° C., more preferably 50 to 100° C., and still more preferably 60 to 90° C. A temperature for heat-cleaning the polyrotaxane of lower than 40° C. may lead to a low cleaning efficiency, leaving free cyclodextrin molecules remained. A temperature for heat-cleaning the polyrotaxane of higher than 120° C. may produce new free cyclodextrin molecules because of decomposition of polyrotaxane.

Heat-cleaning the polyrotaxane and solid-liquid separation by centrifugation or filtration enable production of a wet cake-like refined polyrotaxane. Here, the heat-cleaning can be repeated for further refinement.

To dry the wet cake-like refined polyrotaxane obtained through heat-cleaning, the method of drying can be a known method such as freeze-drying and reduced-pressure drying. The amount of free cyclodextrin molecules in the refined polyrotaxane obtained by drying is preferably 10% by weight or less, more preferably 7% by weight or less, and still more preferably 5% by weight or less. An amount of free cyclodextrin molecules of more than 10% by weight may decrease the characteristics such as the pulley effect of a crosslinked polyrotaxane obtained from the refined polyrotaxane.

The inclusion ratio of the resulting refined polyrotaxane can be 6 to 60% in the present invention, although it depends on the use and purpose of the resulting refined polyrotaxane and crosslinked polyrotaxane. An inclusion ratio of lower than 6% may not give a sufficient pulley effect to the resulting crosslinked polyrotaxane. An inclusion ratio of higher than 60% may result in dense arrangement of cyclodextrin molecules, which are cyclic molecules, so that the mobility of the cyclodextrin molecules decreases. In order to give appropriate mobility to the cyclodextrin molecules and still achieve an inclusion ratio as high as possible, the inclusion ratio is preferably 15 to 40%, and more preferably 20 to 30%.

The inclusion ratio herein refers to a ratio of the inclusion amount of cyclodextrin molecules including a PEG to the maximum inclusion amount of the cyclodextrin molecules for a PEG. The inclusion ratio is optionally controllable by changing the mixing ratio of the PEG to the cyclodextrin or the kind of aqueous medium. The maximum inclusion amount refers to the number of cyclodextrin molecules in the case of the close-packed state in which one cyclodextrin molecule includes two repeating units of the PEG.

The inclusion ratio can be measured by $^1$H-NMR. Specifically, the inclusion ratio can be calculated by dissolving an obtained refined polyrotaxane in DMSO-$d_6$, subjecting the solution to measurement using an NMR measuring device (product of Varian Technologies Japan Ltd., "VARIAN Mercury-400BB"), and comparing the integrated value of cyclodextrin peak at 4 to 6 ppm and the integrated value of cyclodextrin peak and the PEG peak at 3 to 4 ppm.

Advantageous Effects of Invention

The present invention can provide a method for producing a refined polyrotaxane which includes an industrially advantageous method of producing a refined polyrotaxane that has excellent storage stability.

DESCRIPTION OF EMBODIMENTS

The present invention is described below in more detail based on examples which, however, are not intended to limit the scope of the present invention. In the following, a PEG having a carboxyl group at each end of the PEG was produced by oxidation of a PEG in accordance with the method described in WO 05/052026 A.

Example 1

(1) Preparation of a PEG Having Carboxyl Group at Each End of the PEG by TEMPO Oxidation of the PEG In a 1-L flask, 20 g of a PEG (weight average molecular weight: 35,000), 0.2 g of TEMPO (2,2,6,6-tetramethyl-1-piperidinyloxy radical), and 2 g of sodium bromide were dissolved in 200 mL of water. To the solution was added 10 mL of an aqueous solution of sodium hypochlorite (effective chlorine concentration: 5%), and the resulting mixture was stirred at room temperature for 30 minutes. An amount of 10 mL of ethanol was added to decompose the excess of sodium hypochlorite and terminate the reaction.

An organic layer was isolated by repeating extraction with 100 mL of methylene chloride three times using a separating funnel, and the methylene chloride was distilled off using an evaporator. The resulting substance was dissolved in 500 mL of warm ethanol, and the solution was allowed to stand in a freezer (−4° C.) overnight, so that only a PEG having a carboxyl group at each end of the PEG was precipitated. The PEG was collected and dried under reduced pressure. Thereby, 20 g of a PEG having a carboxyl group at each end of the PEG was obtained.

(2) Preparation of Aqueous Dispersion of Pseudopolyrotaxane from α-cyclodextrin and a PEG Having Carboxyl Group at Each End of the PEG A 1-L flask with a stirrer was charged with 650 mL of water, 20 g of the prepared PEG having a carboxyl group at each end of the PEG, and 80 g of a-cyclodextrin. The mixture was stirred with the stirrer at a rotational speed of 200 rpm, and heated to 70° C. to dissolve the substances.

The solution was cooled to 5° C. at a cooling speed of 0.4° C./min while being stirred by the stirrer at a rotational speed of 700 rpm, and further stirred at 5° C. for 10 hours. Thereby, a milky aqueous dispersion of pseudopolyrotaxane having favorable fluidity (solids concentration: 13% by weight) was obtained.

Measurement using a laser diffraction particle size analyzer showed that the particles in the aqueous dispersion of pseudopolyrotaxane had a volume average particle size of 10 μm.

(3) Drying Aqueous Dispersion of Pseudopolyrotaxane

Using a nozzle atomizer spray drier (product of Ohkawara Kakohki Co., Ltd., "L-8"), 750 g of the prepared aqueous dispersion of pseudopolyrotaxane was dried (residence time: 1 minute) at a dryer gas inlet temperature of 160° C. and an outlet temperature of 70° C. under ordinary pressure. Thereby, 93 g of a powdery, dry pseudopolyrotaxane (porous particles with irregular surfaces) was obtained. The obtained dry pseudopolyrotaxane had a water content of 2.2% by weight and a volume average particle size of 35 μm.

(4) Capping of Pseudopolyrotaxane

In a 1-L flask, 0.5 g of adamantane amine was dissolved in 170 mL of dimethylformamide (DMF) at room temperature, and 50 g of the obtained pseudopolyrotaxane was added to the solution, followed by thorough shaking. To the mixture was added a solution of 1.3 g of a BOP reagent (benzotriazole-1-yl-oxy-tris(dimethylamino)phosphonium hexafluorophosphate) in 80 mL of DMF, and the flask was thoroughly shaken. A solution of 0.50 mL of diisopropylethylamine in 80 mL of DMF was further added, and the flask was thoroughly shaken. The obtained mixture was allowed to stand in a refrigerator overnight, so that a wet cake-like polyrotaxane was obtained. The polyrotaxane had favorable filterability, with a time for filtration of 15 minutes. The obtained water-containing cake-like polyrotaxane had a volume average particle size of 40 μm.

(5) Washing of Polyrotaxane

The obtained wet cake-like polyrotaxane was mixed with 300 g of water with stirring to increase the temperature to 70° C. The mixture was stirred at 70° C. for 60 minutes, and filtered again. The washing was repeated twice, whereby a wet cake-like refined polyrotaxane was obtained. The obtained polyrotaxane had favorable filterability, with a time for filtration for each batch of 15 minutes. The obtained wet cake-like refined polyrotaxane was freeze-dried (dried at −10° C. to 20° C. for 48 hours), whereby 43 g of a refined polyrotaxane was obtained.

The refined polyrotaxane had a free cyclodextrin content of 2% by weight.

The free cyclodextrin content refers to a weight percent ratio of the free cyclodextrin molecules to the refined polyrotaxane, and can be calculated from the following formula.

Free cyclodextrin content [% by weight]=((weight of free cyclodextrin molecules in refined polyrotaxane)/(weight of refined polyrotaxane))×100

The weight of the free cyclodextrin molecules in the refined polyrotaxane was determined by the absolute calibration method of liquid chromatograph analysis.

Example 2

An amount of 42 g of a refined polyrotaxane was obtained in the same manner as in Example 1, except that the temperature was increased to 100° C. in "(5) washing of polyrotaxane". The wet cake-like polyrotaxane obtained in "(4) capping of pseudopolyrotaxane" had a volume average particle size of 40 μm.

The filterability in "(5) washing of polyrotaxane" was favorable with a filtration time for each batch of 12 minutes.

The refined polyrotaxane had a free cyclodextrin content of 1% by weight.

Example 3

An amount of 45 g of a refined polyrotaxane was obtained in the same manner as in Example 1, except that the temperature was increased to 40° C. in "(5) washing of polyrotaxane". The wet cake-like polyrotaxane obtained in "(4) capping of pseudopolyrotaxane" had a volume average particle size of 40 μm.

The filterability in "(5) washing of polyrotaxane" was favorable with a filtration time for each batch of 20 minutes.

The refined polyrotaxane had a free cyclodextrin content of 4% by weight.

Example 4

An amount of 47 g of a refined polyrotaxane was obtained in the same manner as in Example 1, except that the washing was performed only once in "(5) washing of polyrotaxane". The wet cake-like polyrotaxane obtained in "(4) capping of pseudopolyrotaxane" had a volume average particle size of 40 μm.

The filterability in "(5) washing of polyrotaxane" was favorable with a filtration time for each batch of 20 minutes.

The refined polyrotaxane had a free cyclodextrin content of 8% by weight.

Example 5

An amount of 42 g of a refined polyrotaxane was obtained in the same manner as in Example 1, except that the aqueous dispersion of pseudopolyrotaxane was dried at 60° C. for 72 hours using a shelf vacuum dryer (product of Tabai Espec, "LHV-112") instead of the nozzle atomizer spray dryer used in "(3) drying of aqueous dispersion of pseudopolyrotaxane", and that the obtained bulky pseudopolyrotaxane was ground into scale-like particles with a volume average particle size of 120 The filterability in "(5) washing of polyrotaxane" was favorable with a filtration time for each batch of 7 minutes. The wet cake-like polyrotaxane obtained in "(4) capping of pseudopolyrotaxane" had a volume average particle size of 125 μm.

The refined polyrotaxane had a free cyclodextrin content of 9% by weight.

Example 6

An amount of 42 g of a refined polyrotaxane was obtained as in Example 5, except that the obtained bulky pseudopolyrotaxane was ground into scale-like particles with a volume average particle size of 480 μm. The filterability in "(5) washing of polyrotaxane" was favorable with a filtration time for each batch of 3 minutes. The wet cake-like polyrotaxane obtained in "(4) capping of pseudopolyrotaxane" had a volume average particle size of 480 μm.

The refined polyrotaxane had a free cyclodextrin content of 10% by weight.

Example 7

An amount of 43 g of a refined polyrotaxane was obtained in the same manner as in Example 1, except that the aqueous dispersion of pseudopolyrotaxane was dried at −10 to 20° C. for 48 hours using a freeze dryer (product of TOKYO RIKAKIKAI CO., LTD., "FDU-2100") instead of the nozzle atomizer spray dryer used in "(3) drying of aqueous dispersion of pseudopolyrotaxane", and that the obtained bulky pseudopolyrotaxane was ground into porous particles with a volume average particle size of 20 μm. The filterability in "(5) washing of polyrotaxane" was favorable with a filtration time for each batch of 60 minutes. The wet cake-like polyrotaxane obtained in "(4) capping of pseudopolyrotaxane" had a volume average particle size of 25 μm.

The refined polyrotaxane had a free cyclodextrin content of 6% by weight.

Comparative Example 1

An amount of 45 g of a refined polyrotaxane was obtained in the same manner as in Example 1, except that the temperature was not increased after addition of 300 g of water to the wet cake-like polyrotaxane, and the mixture was stirred at room temperature (20° C.) in "(5) washing of polyrotaxane". The wet cake-like polyrotaxane obtained in "(4) capping of pseudopolyrotaxane" had a volume average particle size of 40 μm. The filterability in "(5) washing of polyrotaxane" was favorable with a filtration time of 20 minutes, but the refined polyrotaxane had a free cyclodextrin content of 15% by weight.

Comparative Example 2

An amount of 30 g of a refined polyrotaxane was obtained in the same manner as in Comparative Example 1, except the following procedures: the aqueous dispersion of pseudopolyrotaxane obtained in the same manner as in Example 1 was not subjected to "(3) drying of aqueous dispersion of pseudopolyrotaxane" but was centrifuged to remove the supernatant, giving a liquid-containing pseudopolyrotaxane; the liquid-containing pseudopolyrotaxane was further mixed with 500 mL of acetone and centrifuged to remove the supernatant five times; and the resulting pseudopolyrotaxane was subjected to "(4) capping of pseudopolyrotaxane", so that a wet cake-like polyrotaxane with a volume average particle size of 10 μm was obtained. The filterability in "(5) washing of polyrotaxane" was poor with a filtration time of five hours.

The refined polyrotaxane had a free cyclodextrin content of 12% by weight.

<Evaluation>

The refined polyrotaxanes obtained in the examples and comparative examples were stored in a 40° C. thermostat, and their free cyclodextrin contents were determined over time using a high-speed liquid chromatograph. The results are shown in Table 1.

TABLE 1

| | Free cyclodextrin content (% by weight) | | |
|---|---|---|---|
| | Right after production | 10 days later | 50 days later |
| Example 1 | 2 | 2 | 3 |
| Example 2 | 1 | 1 | 2 |
| Example 3 | 4 | 4 | 5 |
| Example 4 | 8 | 9 | 9 |
| Example 5 | 9 | 9 | 9 |
| Example 6 | 10 | 10 | 10 |
| Example 7 | 6 | 6 | 7 |
| Comparative Example 1 | 15 | 44 | 89 |
| Comparative Example 2 | 12 | 39 | — |

INDUSTRIAL APPLICABILITY

The present invention can provide a method for producing a refined polyrotaxane which includes an industrially advantageous method of producing a polyrotaxane that has excellent storage stability.

The invention claimed is:

1. A method for producing a refined polyrotaxane, comprising:
   mixing a polyethylene glycol and a cyclodextrin in an aqueous medium to form an aqueous dispersion of pseudopolyrotaxane that contains the polyethylene glycol which is included in the cavities of the cyclodextrin molecules in a skewered manner;
   spray-drying the aqueous dispersion of pseudopolyrotaxane to obtain a powdery dry pseudopolyrotaxane; and
   a capping step comprising dispersing the dry pseudopolyrotaxane in a medium that does not dissolve the pseudopolyrotaxane and introducing a capping group at each end of the polyethylene glycol of the pseudopolyrotaxane to produce polyrotaxanee; and
   heat-cleaning the polyrotaxane with a cleaning medium.

2. The method for producing a refined polyrotaxane according to claim 1,
   wherein the polyrotaxane is heat-cleaned at 40 to 120° C.

3. The method for producing a refined polyrotaxane according to claim 1,
   wherein the cleaning medium weighs 5 to 100 times the polyrotaxane.

4. The method for producing a refined polyrotaxane according to claim 1,
   wherein the cleaning medium is water.

5. The method for producing a refined polyrotaxane according to claim 1,
   wherein the polyrotaxane has a volume average particle size of 1 to 3,000 μm.

6. The method for producing a refined polyrotaxane according to claim 1,
   wherein the polyethylene glycol has a weight average molecular weight of 1,000 to 500,000.

* * * * *